US012568491B2

(12) United States Patent
Huang et al.

(10) Patent No.: US 12,568,491 B2
(45) Date of Patent: Mar. 3, 2026

(54) SCHEDULING OF AN UPLINK TRANSMISSION OF MULTIPLE TRANSPORT BLOCKS

(71) Applicant: QUALCOMM Incorporated, San Diego, CA (US)

(72) Inventors: Yi Huang, San Diego, CA (US); Gokul Sridharan, Sunnyvale, CA (US); Krishna Kiran Mukkavilli, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 18/306,159

(22) Filed: Apr. 24, 2023

(65) Prior Publication Data

US 2023/0345475 A1      Oct. 26, 2023

Related U.S. Application Data

(60) Provisional application No. 63/363,616, filed on Apr. 26, 2022.

(51) Int. Cl.
| | |
|---|---|
| *H04W 72/1268* | (2023.01) |
| *H04L 1/1822* | (2023.01) |
| *H04L 1/1829* | (2023.01) |
| *H04W 72/232* | (2023.01) |

(52) U.S. Cl.
CPC ....... *H04W 72/1268* (2013.01); *H04L 1/1822* (2013.01); *H04L 1/1854* (2013.01); *H04W 72/232* (2023.01)

(58) Field of Classification Search
CPC ............ H04W 72/1268; H04W 72/232; H04L 1/1822; H04L 1/1854; H04L 1/1819; H04L 1/1887
See application file for complete search history.

(56) References Cited

U.S. PATENT DOCUMENTS

| | | | | |
|---|---|---|---|---|
| 11,284,413 | B2 * | 3/2022 | Dinan | .................. H04W 72/569 |
| 2015/0016318 | A1 * | 1/2015 | Lee | ........................ H04L 1/1861 |
| | | | | 370/280 |
| 2019/0364592 | A1 | 11/2019 | Bhattad et al. | |
| 2021/0266106 | A1 * | 8/2021 | Yan | ........................ H04L 1/1896 |
| 2023/0319848 | A1 * | 10/2023 | Zhou | ..................... H04L 5/0053 |
| | | | | 370/329 |
| 2024/0040598 | A1 * | 2/2024 | Islam | ................ H04W 72/1273 |

FOREIGN PATENT DOCUMENTS

| | | | | |
|---|---|---|---|---|
| EP | | 3664546 A1 * | 6/2020 | ............ H04W 72/23 |
| EP | | 3941142 A1 | 1/2022 | |
| WO | WO-2021023531 A1 | | 2/2021 | |

OTHER PUBLICATIONS

International Search Report and Written Opinion—PCT/US2023/019787—ISA/EPO—Jul. 11, 2023.

* cited by examiner

*Primary Examiner* — Lan-Huong Truong

(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information (DCI) that includes an uplink grant indicating information relating to multiple transport blocks for an uplink transmission, the information indicating which of the multiple transport blocks is to be transmitted. The UE may transmit one or more of the multiple transport blocks in accordance with the DCI. Numerous other aspects are described.

30 Claims, 12 Drawing Sheets

400 ⟶

400

Network Node 405

UE 120

410
Configuration information

415
DCI that includes an uplink grant indicating information relating to multiple transport blocks for an uplink transmission 420
Communicate in accordance with the DCI Receive DCI that includes an uplink grant indicating information relating to multiple transport blocks for an uplink transmission the information indicating which of the multiple transport blocks is to be transmitted

910

Transmit one or more of the multiple transport blocks in accordance with the DCI

920

900

Transmit DCI that includes an uplink grant indicating information relating to multiple transport blocks for an uplink transmission the information indicating which of the multiple transport blocks is to be transmitted

1010

Receive one or more of the multiple transport blocks in accordance with the DCI

1020

1000

SCHEDULING OF AN UPLINK TRANSMISSION OF MULTIPLE TRANSPORT BLOCKS

CROSS-REFERENCE TO RELATED APPLICATION

This Patent application claims priority to U.S. Provisional Patent Application No. 63/363,616, filed on Apr. 26, 2022, entitled "SCHEDULING OF AN UPLINK TRANSMISSION OF MULTIPLE TRANSPORT BLOCKS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for scheduling of an uplink transmission of multiple transport blocks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include receiving downlink control information (DCI) that includes an uplink grant indicating information relating to multiple transport blocks for an uplink transmission, the information indicating which of the multiple transport blocks is to be transmitted. The method may include transmitting one or more of the multiple transport blocks in accordance with the DCI.

Some aspects described herein relate to a method of wireless communication performed by an apparatus of a network node. The method may include transmitting DCI that includes an uplink grant indicating information relating to multiple transport blocks for an uplink transmission, the information indicating which of the multiple transport blocks is to be transmitted. The method may include receiving one or more of the multiple transport blocks in accordance with the DCI.

Some aspects described herein relate to an apparatus for wireless communication at a UE. The apparatus may include a memory and one or more processors coupled to the memory. The one or more processors may be configured to receive DCI that includes an uplink grant indicating information relating to multiple transport blocks for an uplink transmission, the information indicating which of the multiple transport blocks is to be transmitted. The one or more processors may be configured to transmit one or more of the multiple transport blocks in accordance with the DCI.

Some aspects described herein relate to an apparatus for wireless communication at a network node. The apparatus may include a memory and one or more processors coupled to the memory. The one or more processors may be configured to transmit DCI that includes an uplink grant indicating information relating to multiple transport blocks for an uplink transmission, the information indicating which of the multiple transport blocks is to be transmitted. The one or more processors may be configured to receive one or more of the multiple transport blocks in accordance with the DCI.

Some aspects described herein relate to a non-transitory computer-readable medium that stores a set of instructions for wireless communication by a UE. The set of instructions, when executed by one or more processors of the UE, may cause the UE to receive DCI that includes an uplink grant indicating information relating to multiple transport blocks for an uplink transmission, the information indicating which of the multiple transport blocks is to be transmitted. The set of instructions, when executed by one or more processors of the UE, may cause the UE to transmit one or more of the multiple transport blocks in accordance with the DCI.

Some aspects described herein relate to a non-transitory computer-readable medium that stores a set of instructions for wireless communication by a network node. The set of instructions, when executed by one or more processors of the network node, may cause the network node to transmit DCI that includes an uplink grant indicating information relating to multiple transport blocks for an uplink transmission, the information indicating which of the multiple transport blocks is to be transmitted. The set of instructions, when executed by one or more processors of the network node, may cause the network node to receive one or more of the multiple transport blocks in accordance with the DCI.

Some aspects described herein relate to an apparatus for wireless communication. The apparatus may include means for receiving DCI that includes an uplink grant indicating information relating to multiple transport blocks for an uplink transmission, the information indicating which of the multiple transport blocks is to be transmitted. The apparatus may include means for transmitting one or more of the multiple transport blocks in accordance with the DCI.

Some aspects described herein relate to an apparatus for wireless communication. The apparatus may include means for transmitting DCI that includes an uplink grant indicating information relating to multiple transport blocks for an uplink transmission, the information indicating which of the multiple transport blocks is to be transmitted. The apparatus may include means for receiving one or more of the multiple transport blocks in accordance with the DCI.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
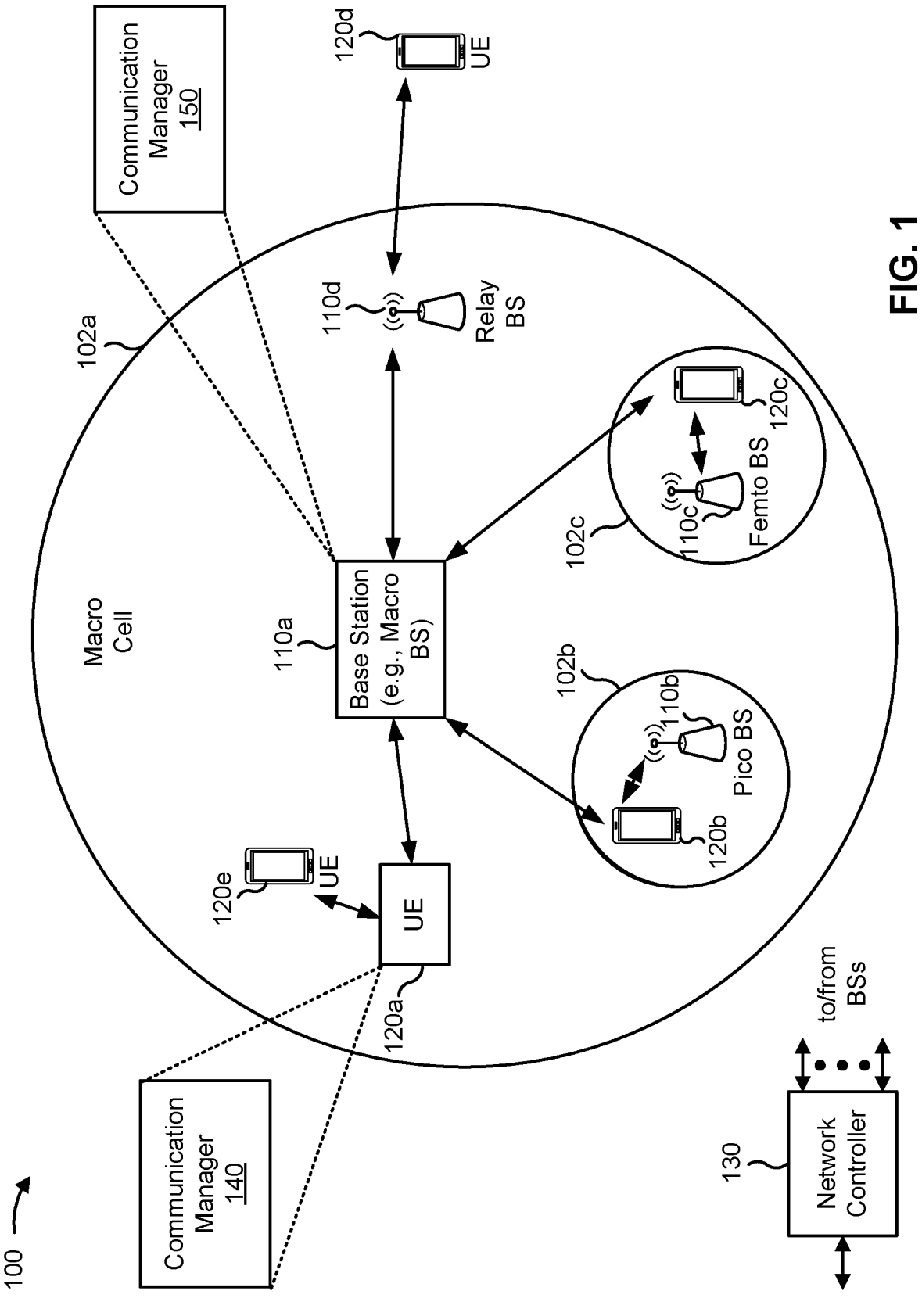
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*. a UE 120*d*, and a UE 120*c*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive downlink control information (DCI) that includes an uplink grant indicating information relating to multiple transport blocks for an uplink transmission, the information indicating which of the multiple transport blocks is to be transmitted; and transmit one or more of the multiple transport blocks in accordance with the DCI. Additionally, or alternatively, the communication manager 140 may perform one or more other operations described herein.

In some aspects, the base station 110 may include a communication manager 150. As described in more detail elsewhere herein, the communication manager 150 may transmit DCI that includes an uplink grant indicating information relating to multiple transport blocks for an uplink transmission, the information indicating which of the multiple transport blocks is to be transmitted; and receive one or more of the multiple transport blocks in accordance with the DCI. Additionally, or alternatively, the communication manager 150 may perform one or more other operations described herein.

As indicated above, FIG. 1 is provided as an example. Other examples may differ from what is described with regard to FIG. 1.

Figure 2:
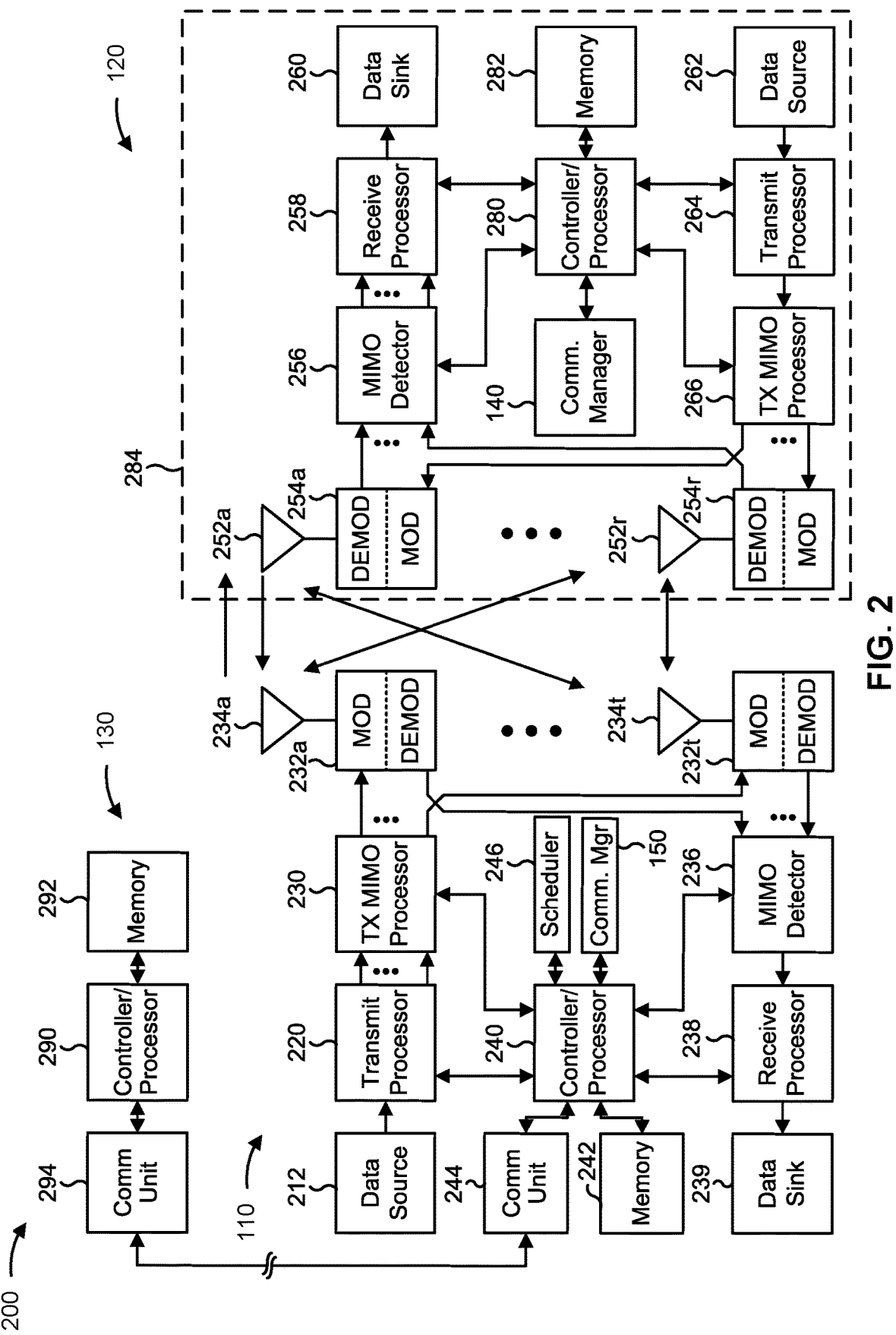
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor 240 of the base station 110, the controller/processor 280 of the UE 120, and/or any other component(s) of FIG. 2 may perform one or more techniques associated with scheduling of an uplink transmission of multiple transport blocks, as described in more detail elsewhere herein. In some aspects, a network node described herein is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving DCI that includes an uplink grant indicating information relating to multiple transport blocks for an uplink transmission, the information indicating which of the multiple transport blocks is to be transmitted; and/or means for transmitting one or more of the multiple transport blocks in accordance with the DCI. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the base station 110) includes means for transmitting DCI that includes an uplink grant indicating information relating to multiple transport blocks for an uplink transmission, the information indicating which of the multiple transport blocks is to be transmitted; and/or means for receiving one or more of the multiple transport blocks in accordance with the DCI. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR BS, 5G NB, access point (AP), a TRP, or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
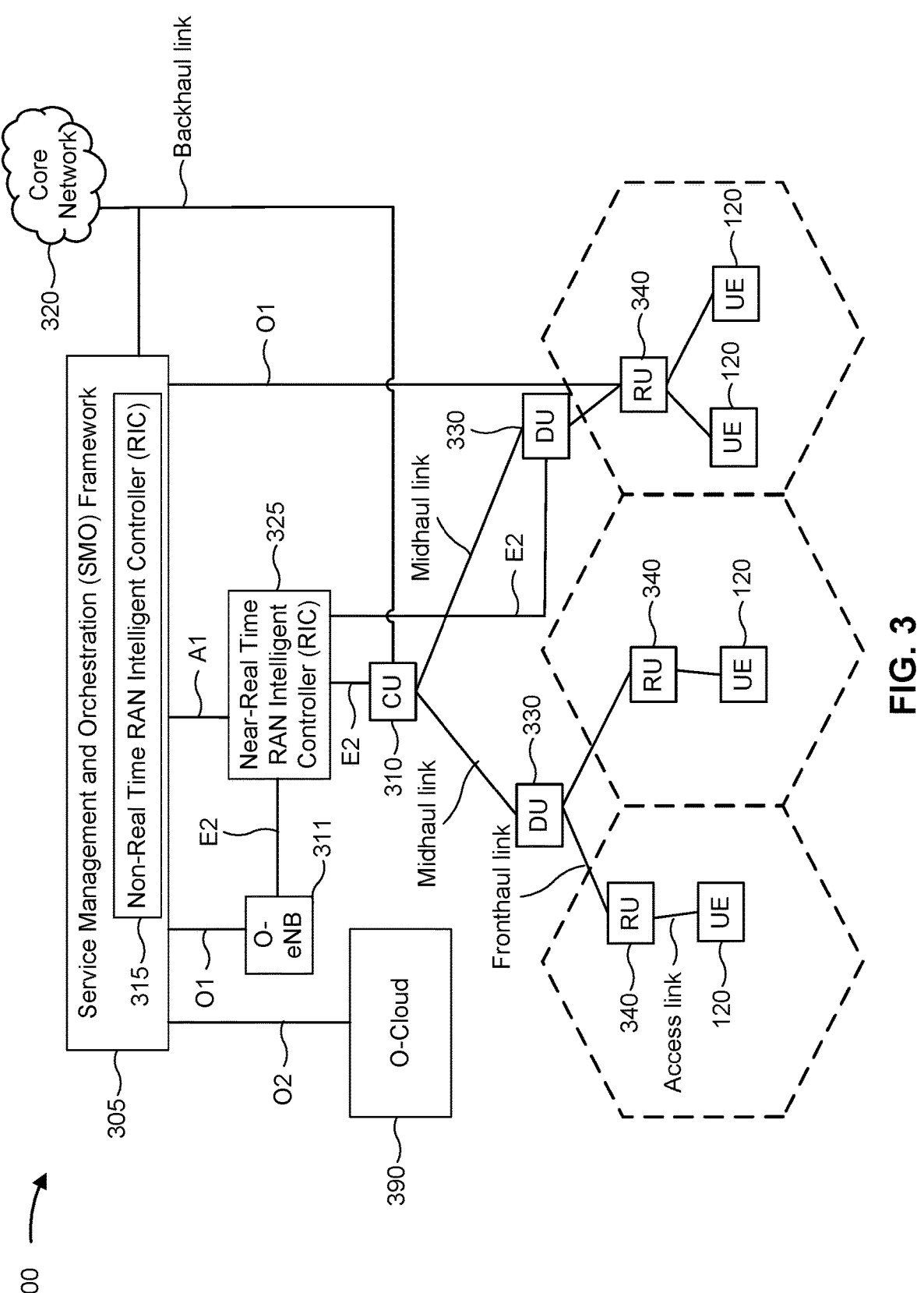
FIG. 3 is a diagram illustrating an example disaggregated base station architecture, in accordance with the present disclosure.

FIG. 3 is a diagram illustrating an example disaggregated base station 300 architecture, in accordance with the present disclosure. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-cNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as AI policies).

As indicated above, FIG. 3 is provided as an example. Other examples may differ from what is described with regard to FIG. 3.

DCI may include an uplink grant to schedule an uplink transmission (e.g., a physical uplink shared channel (PUSCH) transmission) for a UE. Generally, wireless networks may support an uplink grant for scheduling an uplink transmission of only one transport block/codeword (a codeword may include a transport block, and the terms "codeword" and "transport block" may be used interchangeably herein). For example, the uplink grant may include an MCS field, a new data indicator field, and a redundancy version field (which may also be referred to as a "redundancy version identifier field") for scheduling the uplink transmission. In uplink, hybrid automatic repeat request (HARQ), or HARQ acknowledgment (HARQ-ACK), operations may be used to schedule a retransmission of an uplink communication that is not successfully decoded by a receiver (e.g., a base station). Generally, wireless networks may support an uplink grant for scheduling an uplink transmission for only one HARQ process identifier.

Improvements to uplink performance may be achieved by enabling a UE to perform uplink transmissions using four or more transmission layers, such as up to eight transmission layers. Such an ability may be useful for customer premises equipment (CPE), fixed wireless access (FWA) devices, vehicle devices, industrial devices, or the like. Moreover, a UE may perform a PUSCH transmission using eight transmission layers and two transport blocks/codewords. Here, each codeword may be mapped to up to four transmission layers, with a first codeword being mapped to a first set of the transmission layers (which may be referred to as transmission layers $0, 1, 2,$ and $3$) and the second codeword being mapped to a second set of the transmission layers (which may be referred to as transmission layers $4, 5, 6,$ and $7$). However, wireless networks generally lack support for techniques to signal, indicate, schedule, or otherwise enable uplink transmissions and/or uplink retransmissions ("retransmission" may refer to a subsequent transmission of information following an initial transmission of such information) for multiple transport blocks.

In various aspects of techniques and apparatuses described herein, a network node may transmit, and UE may receive, DCI that includes an uplink grant indicating information relating to multiple transport blocks for an uplink transmission. In some aspects, the information may indicate which of the multiple transport blocks are to be transmitted. For example, the information may include respective sets of fields for the multiple transport blocks that facilitate scheduling separate transmission parameters for the multiple transport blocks. Additionally, or alternatively, the information may include an indication, applicable to the multiple transport blocks, indicating which of the transport blocks are active (e.g., are to be transmitted) or inactive (e.g., are not to be transmitted). In this way, initial transmissions and retransmissions in connection with multiple transport blocks may be scheduled with improved efficiency, thereby conserving computing, power, network, and/or communication resources that may have otherwise been consumed by inefficient scheduling (e.g., by using separate uplink grants in separate DCI).

Figure 4:
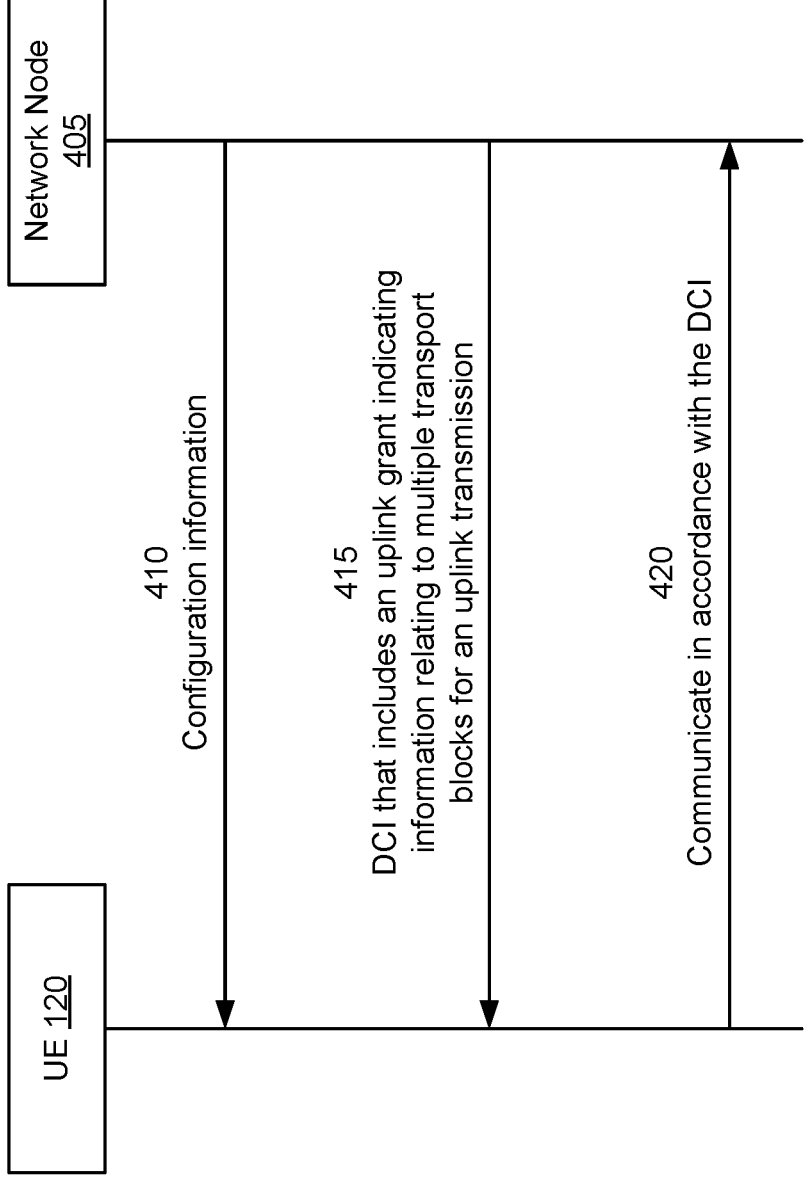
FIGS. 4-8 are diagrams illustrating examples associated with scheduling of an uplink transmission of multiple transport blocks, in accordance with the present disclosure.

FIG. 4 is a diagram illustrating an example 400 associated with scheduling of an uplink transmission of multiple transport blocks, in accordance with the present disclosure. As shown in FIG. 4, example 400 relates to communications of a network node 405 and a UE 120. The network node 405 may be, or may include, a base station 110 or one or more components of a disaggregated base station, such as a CU 310, a DU 330, an RU 340, or the like.

As shown by reference number 410, the network node 405 may transmit, and the UE 120 may receive, configuration information. For example, the network node 405 may transmit, and the UE 120 may receive, the configuration information via RRC signaling (e.g., the configuration information may be an RRC configuration). In some aspects, the configuration information may indicate a maximum quantity of codewords that can be scheduled by DCI (e.g., using a max NrofCode WordsScheduledByDCI parameter). In some aspects, the configuration information may indicate that multiple codewords can be scheduled by DCI (e.g., the configuration information may indicate that the maximum quantity of codewords that can be scheduled by DCI is greater than one codeword, such as two codewords). The UE 120 may communicate, or otherwise operate, in accordance with the configuration information.

As shown by reference number 415, the network node 405 may transmit, and the UE 120 may receive, DCI that includes an uplink grant indicating information relating to multiple (e.g., two) transport blocks for an uplink transmission. The uplink transmission may be a PUSCH transmission. The uplink grant information may indicate which of the multiple transport blocks are to be transmitted. For example, the uplink grant information may indicate that a single one of the multiple transport blocks are to be transmitted, or that the multiple transport blocks are to be transmitted.

In some aspects, the uplink grant information may include respective (e.g., separate) sets of fields for the multiple transport blocks (e.g., to indicate respective transmission parameters for the multiple transport blocks). For example, the uplink grant information may include a first set of fields for a first transport block and a second set of fields for a second transport block. Each set of fields may include an MCS field (e.g., of five bits), a new data indicator field (e.g., of one bit), and a redundancy version field (e.g., of two bits). That is, the first set of fields for the first transport block may include an MCS field, a new data indicator field, and a redundancy version field, and the second set of fields for the second transport block may include an MCS field, a new data indicator field, and a redundancy version field. In some aspects, the second set of fields may be present in the uplink grant if the configuration information indicates that multiple (e.g., two) codewords can be scheduled by DCI, as described herein.

In this way, the uplink grant may schedule the multiple transport blocks with different MCSs from each other, with different new data indicators from each other (e.g., the uplink grant may schedule a first transport block as an initial transmission and a second transport block as a retransmission), and/or with different redundancy versions from each other. For example, a first set of fields for a first transport block may indicate a different value for at least one field (e.g., at least one of the MCS field, the new data indicator field, or the redundancy version field) from a value indicated for the at least one field by a second set of fields for a second transport block. Thus, if initial transmissions of multiple transport blocks are scheduled by the same uplink grant, then the uplink grant may schedule HARQ retransmissions for the multiple transport blocks together.

In some aspects, each set of fields may further include a HARQ process identifier field (e.g., of four bits), which may also be referred to as a "HARQ process number field." That is, the first set of fields for the first transport block may include a HARQ process identifier field, and the second set of fields for the second transport block may include a HARQ process identifier field. In this way, if initial transmissions of the multiple transport blocks are scheduled by separate uplink grants (e.g., using respective HARQ process identifiers), then the uplink grant may schedule HARQ retransmissions for the multiple transport blocks together (e.g., using the respective HARQ process identifiers to reference different transport blocks).

In some aspects, the uplink grant information may indicate whether a transport block is active (e.g., is scheduled to be transmitted) or is inactive (e.g., is not scheduled to be transmitted). For example, if initial transmissions of multiple transport blocks are scheduled by the same uplink grant, then the uplink grant may schedule a HARQ retransmission of only one of the multiple transport blocks by indicating which of the multiple transport blocks is active (and/or which of the multiple transport blocks is inactive).

In some aspects, the uplink grant information may include at least one bit (e.g., one bit or two bits) that is applicable to the multiple transport blocks. For example, the at least one bit may indicate which of the multiple transport blocks are active. As an example, the at least one bit may have a value of zero to indicate that a first transport block is active, or a value of one to indicate that a second transport block is active. Thus, a set of fields of the uplink grant information, as described herein, may be applicable to the transport block that is active (and not applicable to a transport block that is inactive).

In some aspects, a combination of fields of the uplink grant information may be set to particular values to indicate which of the multiple transport blocks are active (or inactive). As described herein, the uplink grant information may include respective sets of fields for the multiple transport blocks. Here, a set of fields that is associated with a transport block may include one or more fields set to particular values to indicate that the transport block is inactive. Thus, a different set of fields, associated with a different transport block, in which the one or more fields are not set to the particular values may indicate that the different transport block is active. The one or more fields used to indicate that the transport block is inactive may include an MCS field and a redundancy version field, among other examples. For example, if the set of fields associated with the transport block indicates a value of 26 for the MCS field and a value of 1 for the redundancy version field, then the transport block may be inactive (e.g., disabled).

As shown by reference number 420, the UE 120 may communicate in accordance with the DCI and the network node 405 may communicate in accordance with the DCI. For example, the UE 120 may transmit, and the network node 405 may receive, the uplink transmission scheduled by the uplink grant of the DCI. In particular, the UE 120 may transmit one or more transport blocks scheduled by the uplink grant (e.g., transmit the one or more transport blocks that the uplink grant information indicates are active). Moreover, the UE 120 may transmit a transport block in accordance with the set of fields (e.g., using transmission parameters indicated by the set of fields), of the uplink grant information, associated with the transport block.

In this way, multiple transport blocks may be scheduled with improved efficiency, thereby conserving computing, power, network, and/or communication resources that may have otherwise been consumed by inefficient scheduling.

As indicated above, FIG. 4 is provided as an example. Other examples may differ from what is described with respect to FIG. 4.

Figure 5:
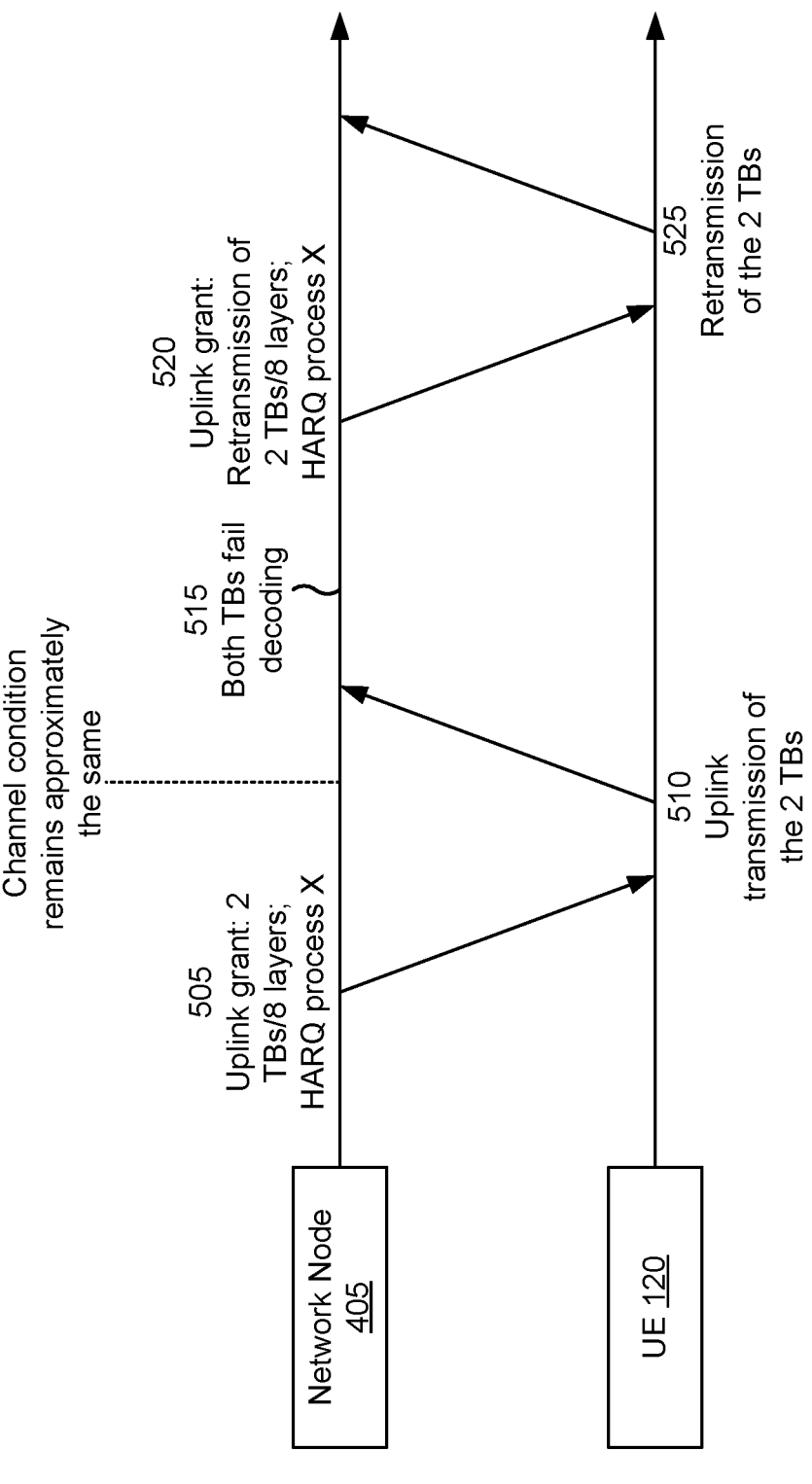

FIG. 5 is a diagram illustrating an example 500 associated with scheduling of an uplink transmission of multiple transport blocks, in accordance with the present disclosure. As shown in FIG. 5, example 500 relates to communications of the network node 405 and the UE 120, as described in connection with FIG. 4.

As shown by reference number 505, the network node 405 may transmit, and the UE 120 may receive, DCI that includes an uplink grant for an uplink transmission (e.g., a PUSCH transmission) of two transport blocks on eight transmission layers (e.g., a first transport block on four transmission layers and a second transport block on four other transmission layers). The uplink grant may indicate a HARQ process identifier X for the transmission of the two transport blocks. The uplink transmission may be an initial transmission of the transport blocks. As shown by reference number 510, the UE 120 may transmit the uplink transmission of the two transport blocks (e.g., in accordance with the uplink grant).

As shown by reference number 515, the network node 405 may fail to decode both transport blocks. As also shown, a condition of a channel between the UE 120 and the network node 405 may have remained approximately the same while the network node transmitted the DCI and the UE 120 transmitted the uplink transmission, and therefore a reduction to the quantity of transmission layers for a retransmission may not be necessary. Accordingly, as shown by reference number 520, the network node 405 may transmit, and the UE 120 may receive, DCI that includes an uplink grant for a retransmission of the two transport blocks on eight transmission layers (e.g., a retransmission for the HARQ process identifier X). In particular, the uplink grant for the retransmission may include a first set of fields (e.g., an MCS field, a new data indicator field, and a redundancy version field) for the first transport block and a second set of fields (e.g., an MCS field, a new data indicator field, and a redundancy version field) for the second transport block, as described herein. In this way, setting both sets of fields in the uplink grant indicates that both transport blocks are to be transmitted. As shown by reference number 525, the UE 120 may transmit the retransmission of the two transport blocks (e.g., in accordance with the uplink grant).

As indicated above, FIG. 5 is provided as an example. Other examples may differ from what is described with respect to FIG. 5.

Figure 6:
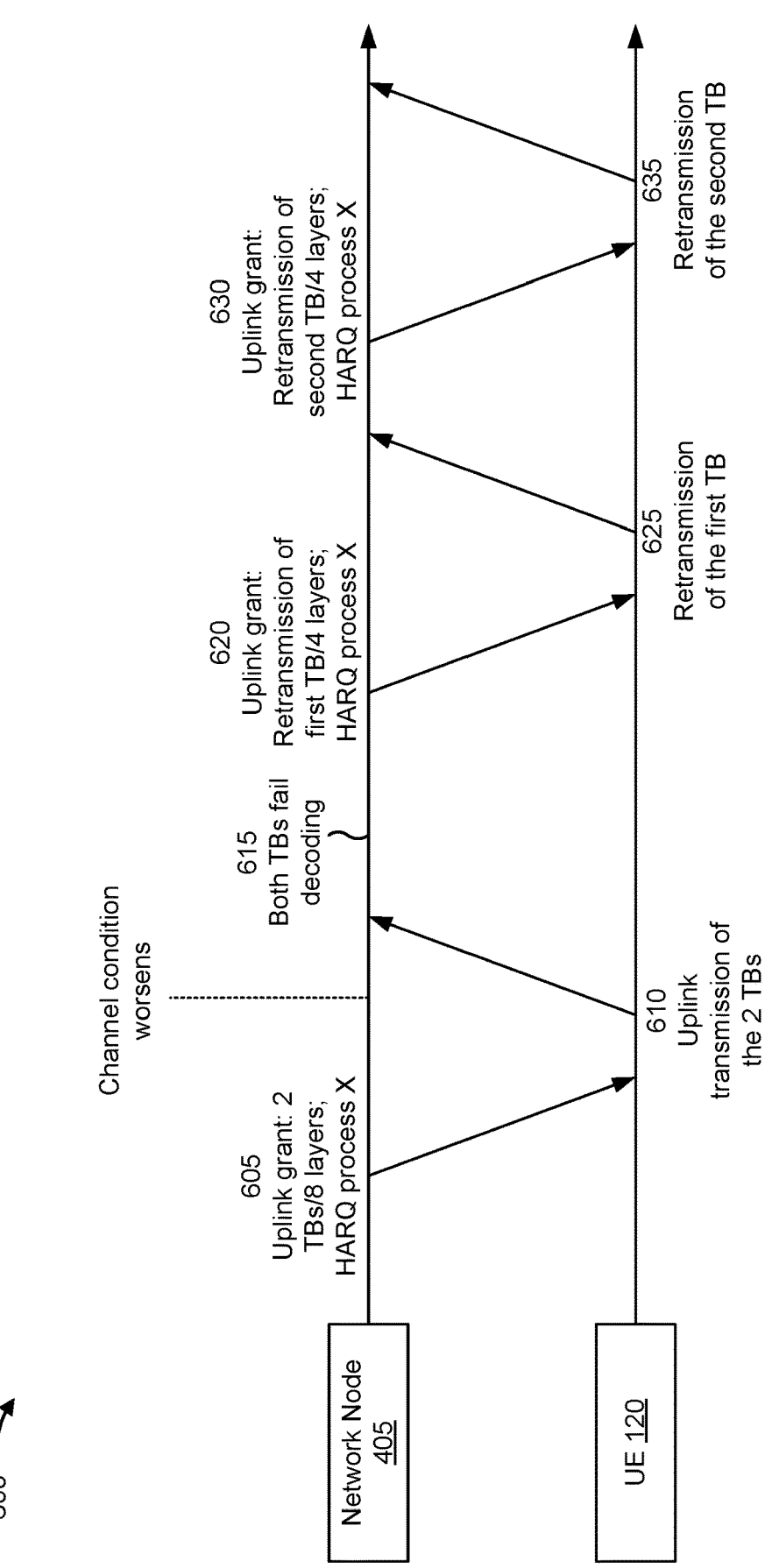

FIG. 6 is a diagram illustrating an example 600 associated with scheduling of an uplink transmission of multiple transport blocks, in accordance with the present disclosure. As shown in FIG. 6, example 600 relates to communications of the network node 405 and the UE 120, as described in connection with FIG. 4.

As shown by reference number 605, the network node 405 may transmit, and the UE 120 may receive, DCI that includes an uplink grant for an uplink transmission (e.g., a PUSCH transmission) of two transport blocks on eight transmission layers (e.g., a first transport block on four transmission layers and a second transport block on four other transmission layers). The uplink grant may indicate a HARQ process identifier X for the transmission of the two transport blocks. The uplink transmission may be an initial transmission of the transport blocks. As shown by reference number 610, the UE 120 may transmit the uplink transmission of the two transport blocks (e.g., in accordance with the uplink grant).

As shown by reference number 615, the network node 405 may fail to decode both transport blocks. As also shown, a condition of a channel between the UE 120 and the network node 405 may have worsened while the network node transmitted the DCI and the UE 120 transmitted the uplink transmission, and therefore a reduction to the quantity of transmission layers may be necessary. Accordingly, as shown by reference number 620, the network node 405 may transmit, and the UE 120 may receive, DCI that includes an uplink grant for a retransmission of a first one of the transport blocks on four transmission layers (e.g., a retransmission for the HARQ process identifier X). In particular, the uplink grant may include an indication of which of the transport blocks is to be transmitted, as described herein. For example, the uplink grant may include the at least one bit to indicate which transport block is to be transmitted, as described herein. As another example, the uplink grant may set a combination of fields to particular values to indicate which transport block is to be transmitted, as described herein. As shown by reference number 625, the UE 120 may transmit the retransmission of the first one of the transport blocks (e.g., in accordance with the uplink grant). As shown by reference number 630, the network node 405 may transmit, and the UE 120 may receive, DCI that includes an uplink grant for a retransmission of a second one of the transport blocks on four transmission layers (e.g., a retransmission for the HARQ process identifier X). In particular, the uplink grant may include an indication of which of the transport blocks is to be transmitted, in a similar manner as described above. As shown by reference number 635, the UE 120 may transmit the retransmission of the second one of the transport blocks (e.g., in accordance with the uplink grant).

As indicated above, FIG. 6 is provided as an example. Other examples may differ from what is described with respect to FIG. 6.

Figure 7:
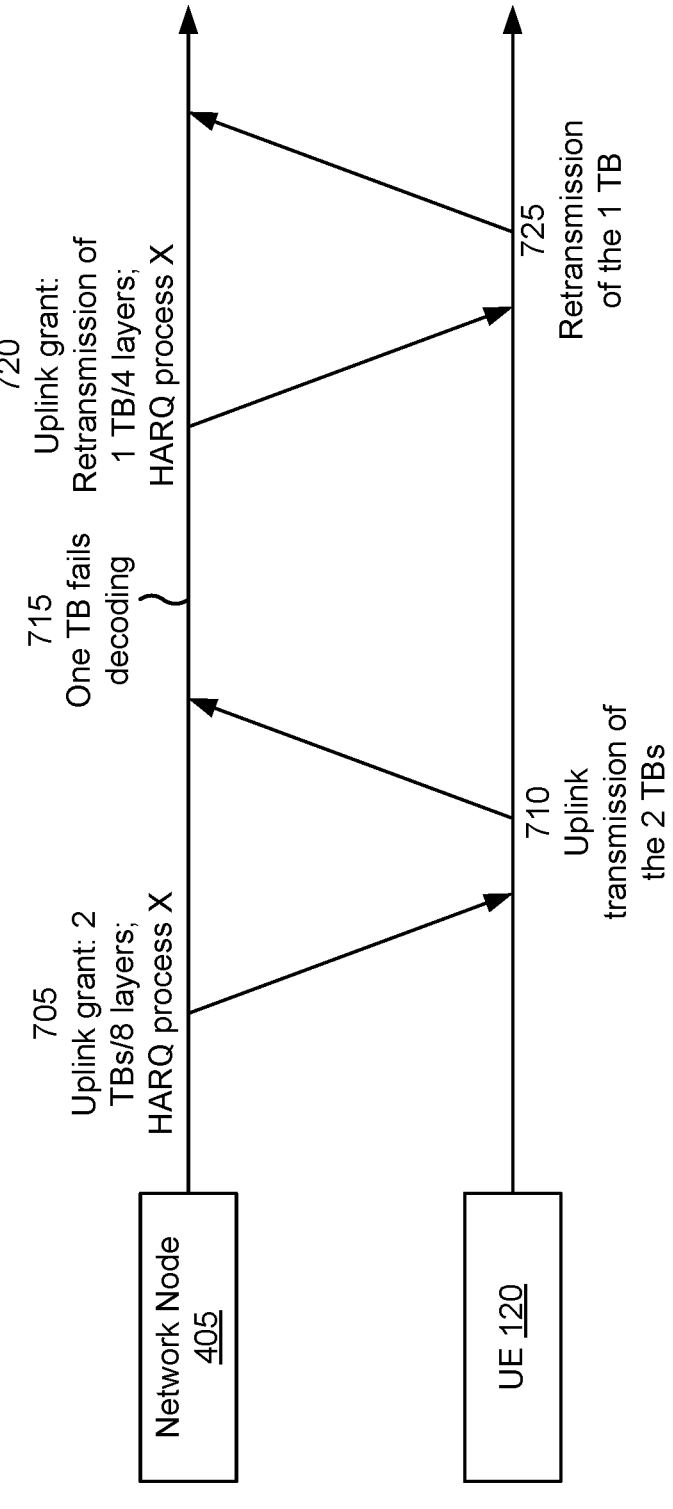

FIG. 7 is a diagram illustrating an example 700 associated with scheduling of an uplink transmission of multiple transport blocks, in accordance with the present disclosure. As shown in FIG. 7, example 700 relates to communications of the network node 405 and the UE 120, as described in connection with FIG. 4.

As shown by reference number 705, the network node 405 may transmit, and the UE 120 may receive, DCI that includes an uplink grant for an uplink transmission (e.g., a PUSCH transmission) of two transport blocks on eight transmission layers (e.g., a first transport block on four transmission layers and a second transport block on four other transmission layers). The uplink grant may indicate a HARQ process identifier X for the transmission of the two transport blocks. The uplink transmission may be an initial transmission of the transport blocks. As shown by reference number 710, the UE 120 may transmit the uplink transmission of the two transport blocks (e.g., in accordance with the uplink grant).

As shown by reference number 715, the network node 405 may fail to decode one of the transport blocks (while the other of the transport blocks passes decoding). Accordingly, as shown by reference number 720, the network node 405 may transmit, and the UE 120 may receive, DCI that includes an uplink grant for a retransmission of the one transport block on four transmission layers (e.g., a retransmission for the HARQ process identifier X). In particular, the uplink grant may include an indication of which of the transport blocks is to be transmitted, as described herein. For example, the uplink grant may include the at least one bit to indicate which transport block is to be transmitted, as described herein. As another example, the uplink grant may set a combination of fields to particular values to indicate which transport block is to be transmitted, as described herein. As shown by reference number 725, the UE 120 may transmit the retransmission of the one transport block (e.g., in accordance with the uplink grant).

As indicated above, FIG. 7 is provided as an example. Other examples may differ from what is described with respect to FIG. 7.

Figure 8:
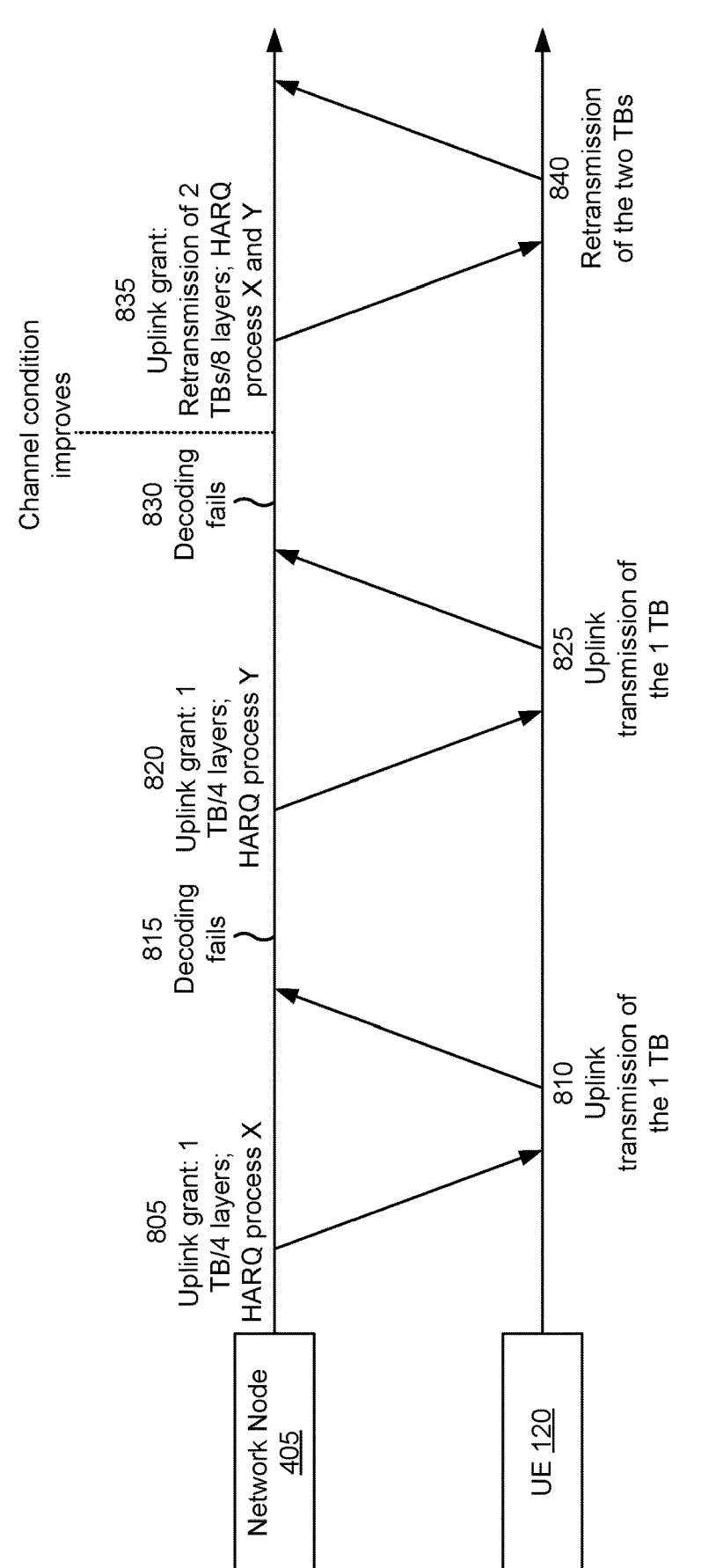

FIG. 8 is a diagram illustrating an example 800 associated with scheduling of an uplink transmission of multiple transport blocks, in accordance with the present disclosure. As shown in FIG. 8, example 800 relates to communications of the network node 405 and the UE 120, as described in connection with FIG. 4.

As shown by reference number 805, the network node 405 may transmit, and the UE 120 may receive, DCI that includes an uplink grant for an uplink transmission (e.g., a PUSCH transmission) of a first transport block on four transmission layers. The uplink grant may indicate a HARQ process identifier X for the transmission of the first transport block. The uplink transmission may be an initial transmission of the first transport block. As shown by reference number 810, the UE 120 may transmit the uplink transmission of the first transport block (e.g., in accordance with the uplink grant). As shown by reference number 815, the network node 405 may fail to decode the first transport block. As shown by reference number 820, the network node 405 may transmit, and the UE 120 may receive, DCI that includes an uplink grant for an uplink transmission (e.g., a PUSCH transmission) of a second transport block on four transmission layers. The uplink grant may indicate a HARQ process identifier Y for the transmission of the second transport block. The uplink transmission may be an initial transmission of the second transport block. As shown by reference number 825, the UE 120 may transmit the uplink transmission of the second transport block (e.g., in accordance with the uplink grant). As shown by reference number 830, the network node 405 may fail to decode the second transport block.

As also shown, a condition of a channel between the UE 120 and the network node 405 may have improved after the UE 120 transmitted the first transport block and the second transport block, and therefore an increase to the quantity of transmission layers may be used. Accordingly, as shown by reference number 835, the network node 405 may transmit, and the UE 120 may receive, DCI that includes an uplink grant for a retransmission of the first transport block and the second transport block on eight transmission layers. In particular, the uplink grant for the retransmission may include a first set of fields that includes a HARQ process identifier field (e.g., set to HARQ process identifier X) for the first transport block and a second set of fields that includes a HARQ process identifier field (e.g., set to HARQ process identifier Y) for the second transport block, as described herein. In this way, the UE 120 may identify which transport blocks the uplink grant is scheduling for retransmission, as well as identify which sets of fields are applicable to the first transport block and the second transport block. As shown by reference number 840, the UE 120 may transmit the retransmissions of the first transport block and the second transport block (e.g., in accordance with the uplink grant).

As indicated above, FIG. 8 is provided as an example. Other examples may differ from what is described with respect to FIG. 8.

Figure 9:
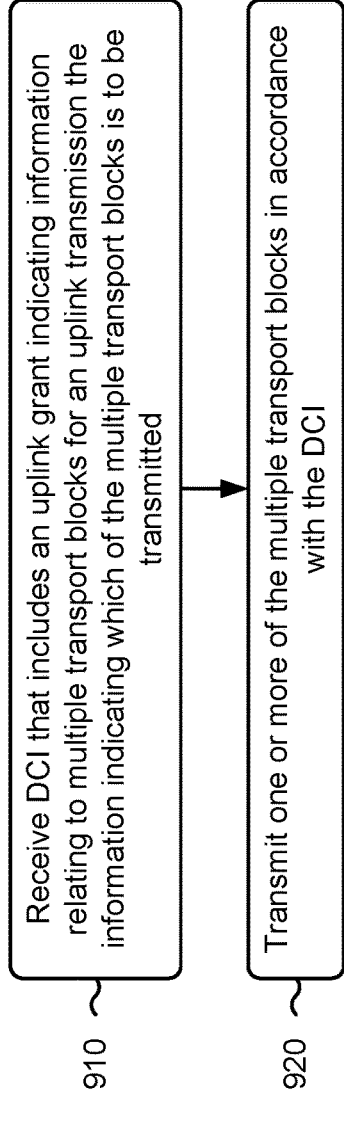
FIGS. 9-10 are diagrams illustrating example processes associated with scheduling of an uplink transmission of multiple transport blocks, in accordance with the present disclosure.

FIG. 9 is a diagram illustrating an example process 900 performed, for example, by a UE, in accordance with the present disclosure. Example process 900 is an example where the UE (e.g., UE 120) performs operations associated with scheduling of an uplink transmission of multiple transport blocks.

As shown in FIG. 9, in some aspects, process 900 may include receiving DCI that includes an uplink grant indicating information relating to multiple transport blocks for an uplink transmission, the information indicating which of the multiple transport blocks is to be transmitted (block 910). For example, the UE (e.g., using communication manager 140 and/or reception component 1102, depicted in FIG. 11)

may receive DCI that includes an uplink grant indicating information relating to multiple transport blocks for an uplink transmission, the information indicating which of the multiple transport blocks is to be transmitted, as described above.

As further shown in FIG. 9, in some aspects, process 900 may include transmitting one or more of the multiple transport blocks in accordance with the DCI (block 920). For example, the UE (e.g., using communication manager 140 and/or transmission component 1104, depicted in FIG. 11) may transmit one or more of the multiple transport blocks in accordance with the DCI, as described above.

Process 900 may include additional aspects, such as any single aspect or any combination of aspects described below and/or in connection with one or more other processes described elsewhere herein.

In a first aspect, the information includes respective sets of fields for the multiple transport blocks.

In a second aspect, alone or in combination with the first aspect, each set of fields, of the respective sets of fields, includes a modulation and coding scheme field, a new data indicator field, and a redundancy version field.

In a third aspect, alone or in combination with one or more of the first and second aspects, each set of fields, of the respective sets of fields, further includes a hybrid automatic repeat request process identifier field.

In a fourth aspect, alone or in combination with one or more of the first through third aspects, a first set of fields, of the respective sets of fields, for a first transport block, of the multiple transport blocks, indicates a different value for at least one field from a value indicated for the at least one field by a second set of fields, of the respective sets of fields, for a second transport block of the multiple transport blocks.

In a fifth aspect, alone or in combination with one or more of the first through fourth aspects, a set of fields, of the respective sets of fields, associated with a transport block, of the multiple transport blocks, includes one or more fields set to particular values to indicate that the transport block is inactive.

In a sixth aspect, alone or in combination with one or more of the first through fifth aspects, the information includes at least one bit, that is applicable to the multiple transport blocks, indicating which of the multiple transport blocks is active.

In a seventh aspect, alone or in combination with one or more of the first through sixth aspects, the multiple transport blocks include a first transport block and a second transport block for which initial transmissions were scheduled by a same uplink grant, and the uplink grant is for retransmissions of the first transport block and the second transport block.

In an eighth aspect, alone or in combination with one or more of the first through sixth aspects, the multiple transport blocks include a first transport block and a second transport block for which initial transmissions were scheduled by a same uplink grant, and the uplink grant is for a retransmission of only one of the first transport block or the second transport block.

In a ninth aspect, alone or in combination with one or more of the first through sixth aspects, the multiple transport blocks include a first transport block associated with a first hybrid automatic repeat request (HARQ) process identifier and a second transport block associated with a second HARQ process identifier, for which initial transmissions were scheduled by separate uplink grants, and the uplink grant is for retransmissions of the first transport block and the second transport block.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
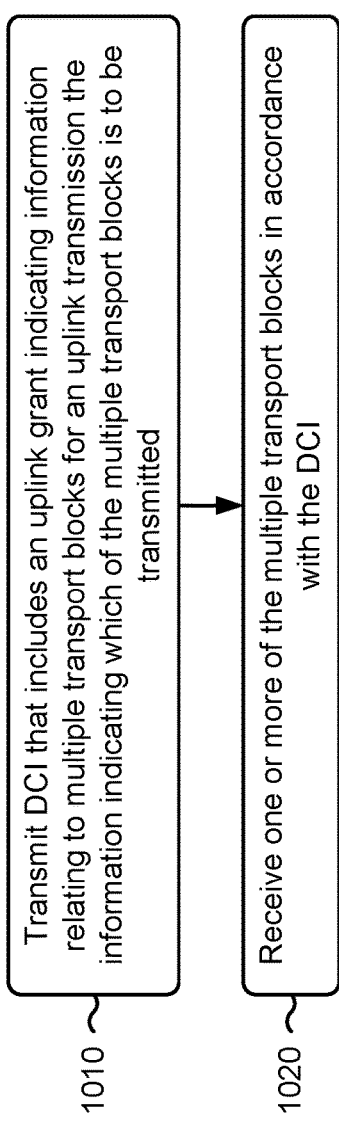

FIG. 10 is a diagram illustrating an example process 1000 performed, for example, by a network node, in accordance with the present disclosure. Example process 1000 is an example where the network node (e.g., network node 405) performs operations associated with scheduling of an uplink transmission of multiple transport blocks.

As shown in FIG. 10, in some aspects, process 1000 may include transmitting DCI that includes an uplink grant indicating information relating to multiple transport blocks for an uplink transmission, the information indicating which of the multiple transport blocks is to be transmitted (block 1010). For example, the network node (e.g., using communication manager 1208 and/or transmission component 1204, depicted in FIG. 12) may transmit DCI that includes an uplink grant indicating information relating to multiple transport blocks for an uplink transmission, the information indicating which of the multiple transport blocks is to be transmitted, as described above.

As further shown in FIG. 10, in some aspects, process 1000 may include receiving one or more of the multiple transport blocks in accordance with the DCI (block 1020). For example, the network node (e.g., using communication manager 1208 and/or reception component 1202, depicted in FIG. 12) may receive one or more of the multiple transport blocks in accordance with the DCI, as described above.

Process 1000 may include additional aspects, such as any single aspect or any combination of aspects described below and/or in connection with one or more other processes described elsewhere herein.

In a first aspect, the information includes respective sets of fields for the multiple transport blocks.

In a second aspect, alone or in combination with the first aspect, each set of fields, of the respective sets of fields, includes a modulation and coding scheme field, a new data indicator field, and a redundancy version field.

In a third aspect, alone or in combination with one or more of the first and second aspects, each set of fields, of the respective sets of fields, further includes a hybrid automatic repeat request process identifier field.

In a fourth aspect, alone or in combination with one or more of the first through third aspects, a first set of fields, of the respective sets of fields, for a first transport block, of the multiple transport blocks, indicates a different value for at least one field from a value indicated for the at least one field by a second set of fields, of the respective sets of fields, for a second transport block of the multiple transport blocks.

In a fifth aspect, alone or in combination with one or more of the first through fourth aspects, a set of fields, of the respective sets of fields, associated with a transport block, of the multiple transport blocks, includes one or more fields set to particular values to indicate that the transport block is inactive.

In a sixth aspect, alone or in combination with one or more of the first through fifth aspects, the information includes at least one bit, that is applicable to the multiple transport blocks, indicating which of the multiple transport blocks is active.

In a seventh aspect, alone or in combination with one or more of the first through sixth aspects, the multiple transport blocks include a first transport block and a second transport block for which initial transmissions were scheduled by a same uplink grant, and the uplink grant is for retransmissions of the first transport block and the second transport block.

In an eighth aspect, alone or in combination with one or more of the first through sixth aspects, the multiple transport blocks include a first transport block and a second transport block for which initial transmissions were scheduled by a same uplink grant, and the uplink grant is for a retransmission of only one of the first transport block or the second transport block.

In a ninth aspect, alone or in combination with one or more of the first through sixth aspects, the multiple transport blocks include a first transport block associated with a first hybrid automatic repeat request (HARQ) process identifier and a second transport block associated with a second HARQ process identifier, for which initial transmissions were scheduled by separate uplink grants, and the uplink grant is for retransmissions of the first transport block and the second transport block.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
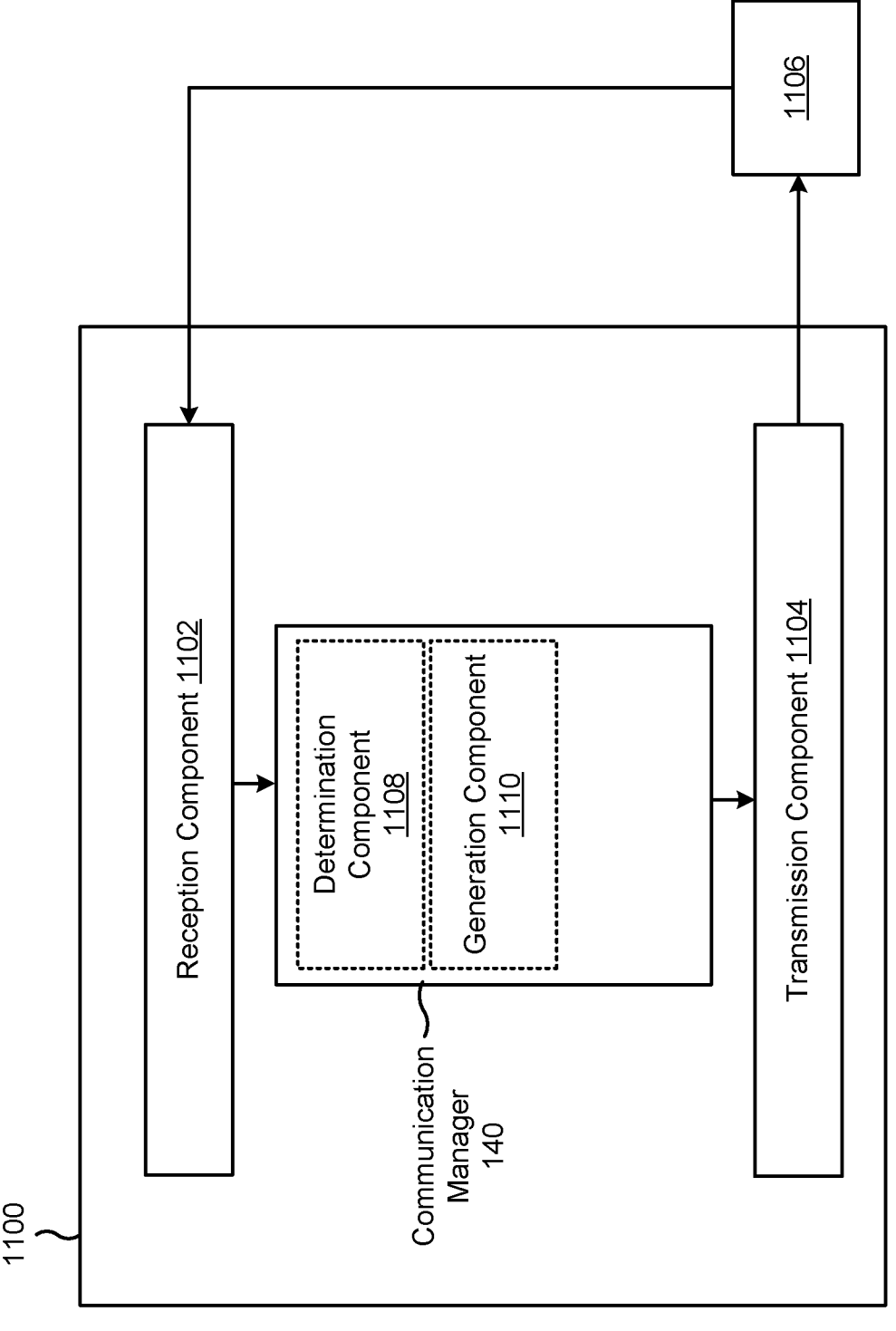
FIGS. 11-12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a determination component 1108 or a generation component 1110, among other examples.

In some aspects, the apparatus 1100 may be configured to perform one or more operations described herein in connection with FIGS. 4-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive DCI that includes an uplink grant indicating information relating to multiple transport blocks for an uplink transmission, the information indicating which of the multiple transport blocks is to be transmitted. The determination component may process the DCI to interpret one or more fields of the DCI. The generation component may generate the multiple transport blocks (e.g., generate multiple codewords that include the multiple transport blocks). The transmission component 1104 may transmit one or more of the multiple transport blocks in accordance with the DCI.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
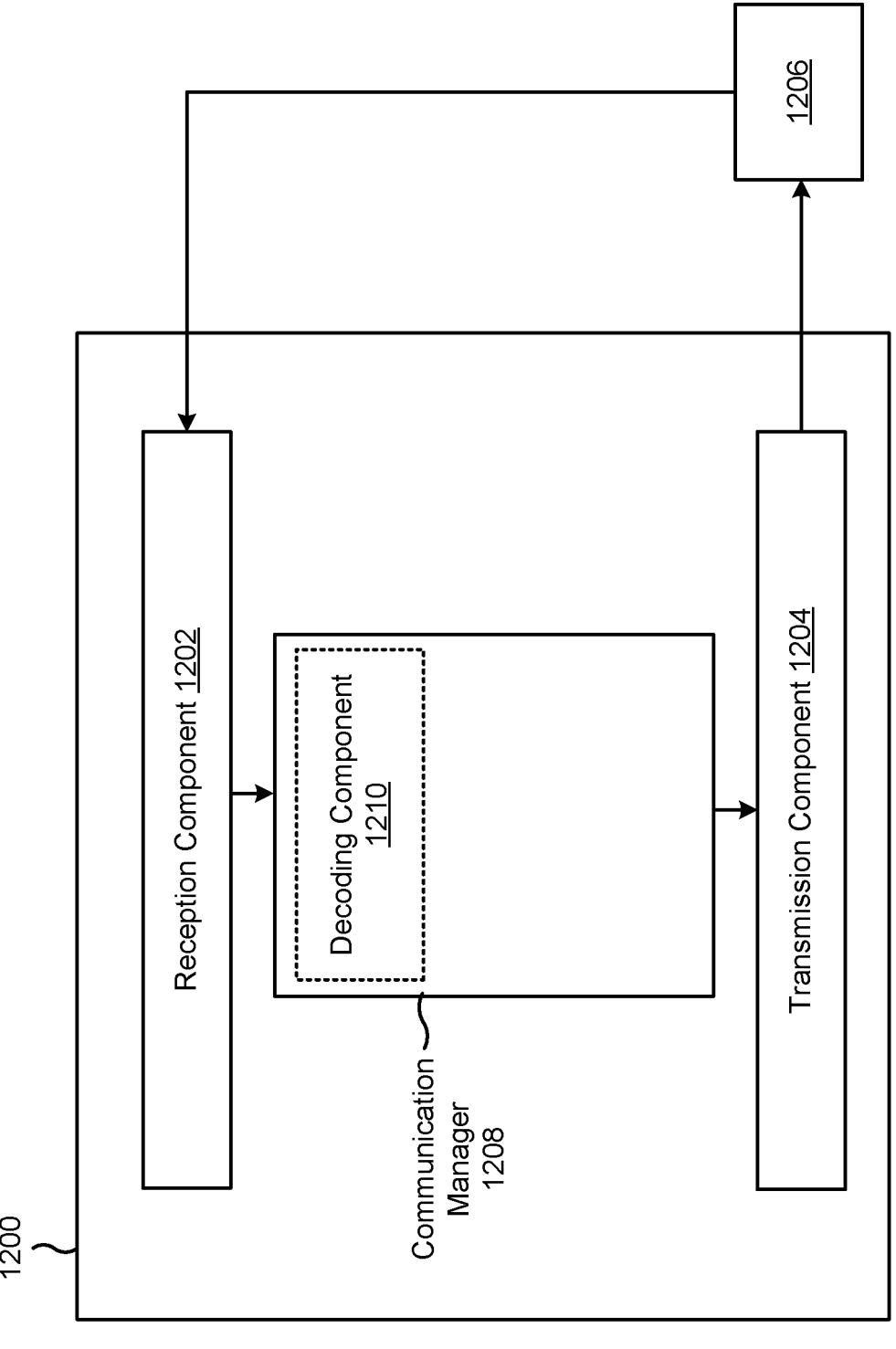

FIG. 12 is a diagram of an example apparatus 1200 for wireless communication. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 1208. The communication manager 1208 may include, may be included in, or may be similar to the communication manager 150. The communication manager 1208 may include a decoding component 1210, among other examples.

In some aspects, the apparatus 1200 may be configured to perform one or more operations described herein in connection with FIGS. 4-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The transmission component 1204 may transmit DCI that includes an uplink grant indicating information relating to multiple transport blocks for an uplink transmission, the information indicating which of the multiple transport blocks is to be transmitted. The reception component 1202 may receive one or more of the multiple transport blocks in accordance with the DCI. The decoding component 1210 may decode (or attempt to decode) the multiple transport blocks.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving downlink control information (DCI) that includes an uplink grant indicating information relating to multiple transport blocks for an uplink transmission, the information indicating which of the multiple transport blocks is to be transmitted; and transmitting one or more of the multiple transport blocks in accordance with the DCI.

Aspect 2: The method of Aspect 1, wherein the information includes respective sets of fields for the multiple transport blocks.

Aspect 3: The method of Aspect 2, wherein each set of fields, of the respective sets of fields, includes a modulation and coding scheme field, a new data indicator field, and a redundancy version field.

Aspect 4: The method of Aspect 3, wherein each set of fields, of the respective sets of fields, further includes a hybrid automatic repeat request process identifier field.

Aspect 5: The method of any of Aspects 2-4, wherein a first set of fields, of the respective sets of fields, for a first transport block, of the multiple transport blocks, indicates a different value for at least one field from a value indicated for the at least one field by a second set of fields, of the respective sets of fields, for a second transport block of the multiple transport blocks.

Aspect 6: The method of any of Aspects 2-5, wherein a set of fields, of the respective sets of fields, associated with a transport block, of the multiple transport blocks, includes one or more fields set to particular values to indicate that the transport block is inactive.

Aspect 7: The method of Aspect 6, wherein the one or more fields include a modulation and coding scheme field and a redundancy version field.

Aspect 8: The method of any of Aspects 1-7, wherein the information includes at least one bit, that is applicable to the multiple transport blocks, indicating which of the multiple transport blocks is active.

Aspect 9: The method of any of Aspects 1-8, wherein the multiple transport blocks include a first transport block and a second transport block for which initial transmissions were scheduled by a same uplink grant, and wherein the uplink grant is for retransmissions of the first transport block and the second transport block.

Aspect 10: The method of any of Aspects 1-8, wherein the multiple transport blocks include a first transport block and a second transport block for which initial transmissions were scheduled by a same uplink grant, and wherein the uplink grant is for a retransmission of only one of the first transport block or the second transport block.

Aspect 11: The method of any of Aspects 1-8, wherein the multiple transport blocks include a first transport block associated with a first hybrid automatic repeat request (HARQ) process identifier and a second transport block associated with a second HARQ process identifier, for which initial transmissions were scheduled by separate uplink grants, and wherein the uplink grant is for retransmissions of the first transport block and the second transport block.

Aspect 12: A method of wireless communication performed by a network node, comprising: transmitting downlink control information (DCI) that includes an uplink grant indicating information relating to multiple transport blocks for an uplink transmission, the information indicating which of the multiple transport blocks is to be transmitted; and receiving one or more of the multiple transport blocks in accordance with the DCI.

Aspect 13: The method of Aspect 12, wherein the information includes respective sets of fields for the multiple transport blocks.

Aspect 14: The method of Aspect 13, wherein each set of fields, of the respective sets of fields, includes a modulation and coding scheme field, a new data indicator field, and a redundancy version field.

Aspect 15: The method of Aspect 14, wherein each set of fields, of the respective sets of fields, further includes a hybrid automatic repeat request process identifier field.

Aspect 16: The method of any of Aspects 13-15, wherein a first set of fields, of the respective sets of fields, for a first transport block, of the multiple transport blocks, indicates a different value for at least one field from a value indicated for the at least one field by a second set of fields, of the respective sets of fields, for a second transport block of the multiple transport blocks.

Aspect 17: The method of any of Aspects 13-16, wherein a set of fields, of the respective sets of fields, associated with a transport block, of the multiple transport blocks, includes one or more fields set to particular values to indicate that the transport block is inactive.

Aspect 18: The method of Aspect 17, wherein the one or more fields include a modulation and coding scheme field and a redundancy version field.

Aspect 19: The method of any of Aspects 12-18, wherein the information includes at least one bit, that is applicable to the multiple transport blocks, indicating which of the multiple transport blocks is active.

Aspect 20: The method of any of Aspects 12-19, wherein the multiple transport blocks include a first transport block and a second transport block for which initial transmissions were scheduled by a same uplink grant, and wherein the uplink grant is for retransmissions of the first transport block and the second transport block.

Aspect 21: The method of any of Aspects 12-19, wherein the multiple transport blocks include a first transport block and a second transport block for which initial transmissions were scheduled by a same uplink grant, and wherein the uplink grant is for a retransmission of only one of the first transport block or the second transport block.

Aspect 22: The method of any of Aspects 12-19, wherein the multiple transport blocks include a first transport block associated with a first hybrid automatic repeat request (HARQ) process identifier and a second transport block associated with a second HARQ process identifier, for which initial transmissions were scheduled by separate uplink grants, and wherein the uplink grant is for retransmissions of the first transport block and the second transport block.

Aspect 23: An apparatus for wireless communication at a device, comprising a processor; memory coupled with the processor; and instructions stored in the memory and executable by the processor to cause the apparatus to perform the method of one or more of Aspects 1-11.

Aspect 24: A device for wireless communication, comprising a memory and one or more processors coupled to the memory, the one or more processors configured to perform the method of one or more of Aspects 1-11.

Aspect 25: An apparatus for wireless communication, comprising at least one means for performing the method of one or more of Aspects 1-11.

Aspect 26: A non-transitory computer-readable medium storing code for wireless communication, the code comprising instructions executable by a processor to perform the method of one or more of Aspects 1-11.

Aspect 27: A non-transitory computer-readable medium storing a set of instructions for wireless communication, the set of instructions comprising one or more instructions that, when executed by one or more processors of a device, cause the device to perform the method of one or more of Aspects 1-11.

Aspect 28: An apparatus for wireless communication at a device, comprising a processor; memory coupled with the processor; and instructions stored in the memory and executable by the processor to cause the apparatus to perform the method of one or more of Aspects 12-22.

Aspect 29: A device for wireless communication, comprising a memory and one or more processors coupled to the memory, the one or more processors configured to perform the method of one or more of Aspects 12-22.

Aspect 30: An apparatus for wireless communication, comprising at least one means for performing the method of one or more of Aspects 12-22.

Aspect 31: A non-transitory computer-readable medium storing code for wireless communication, the code comprising instructions executable by a processor to perform the method of one or more of Aspects 12-22.

Aspect 32: A non-transitory computer-readable medium storing a set of instructions for wireless communication, the set of instructions comprising one or more instructions that, when executed by one or more processors of a device, cause the device to perform the method of one or more of Aspects 12-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c. a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to cause the UE to:
   receive downlink control information (DCI) that includes an uplink grant information relating to multiple transport blocks for an uplink transmission,
   the uplink grant information indicating which of the multiple transport blocks is to be transmitted, and
   the uplink grant information including a first set of fields for a first transport block of the multiple transport blocks and a second set of fields for a second transport block of the multiple transport blocks; and transmit one or more of the multiple transport blocks in accordance with the DCI.

2. The apparatus of claim 1, wherein the uplink grant information includes respective sets of fields for the multiple transport blocks.

3. The apparatus of claim 2, wherein each set of fields, of the respective sets of fields, includes a modulation and coding scheme field, a new data indicator field, and a redundancy version field.

4. The apparatus of claim 3, wherein each set of fields, of the respective sets of fields, further includes a hybrid automatic repeat request process identifier field.

5. The apparatus of claim 1, wherein the first set of fields indicates a different value for at least one field from a value indicated for the at least one field by the second set of fields.

6. The apparatus of claim 1, wherein the first set of fields includes one or more fields set to particular values to indicate that the first transport block is inactive.

7. The apparatus of claim 6, wherein the one or more fields include a modulation and coding scheme field and a redundancy version field.

8. The apparatus of claim 1, wherein the uplink grant information includes at least one bit, that is applicable to the multiple transport blocks, indicating which of the multiple transport blocks is active.

9. The apparatus of claim 1, wherein the first transport block and the second transport block are associated with initial transmissions scheduled by a same uplink grant, and
   wherein the uplink grant information is for retransmissions of the first transport block and the second transport block.

10. The apparatus of claim 1, wherein the first transport block and the second transport block are associated with initial transmissions scheduled by a same uplink grant, and
   wherein the uplink grant information is for a retransmission of only one of the first transport block or the second transport block.

11. The apparatus of claim 1, wherein the first transport block is associated with a first hybrid automatic repeat request (HARQ) process identifier and the second transport block is associated with a second HARQ process identifier,
   wherein the first transport block and the second transport block are associated with initial transmissions scheduled by separate uplink grants, and
   wherein the uplink grant information is for retransmissions of the first transport block and the second transport block.

12. An apparatus for wireless communication at a network node, comprising:
   a memory; and
   one or more processors, coupled to the memory, configured to cause the network node to:
   transmit downlink control information (DCI) that includes an uplink grant
   information relating to multiple transport blocks for an uplink transmission,
      the uplink grant information indicating which of the multiple transport blocks is to be transmitted, and
      the uplink grant information including a first set of fields for a first transport block of the multiple transport blocks and a second set of fields for a second transport block of the multiple transport blocks; and
   receive one or more of the multiple transport blocks in accordance with the DCI.

13. The apparatus of claim 12, wherein the uplink grant information includes respective sets of fields for the multiple transport blocks.

14. The apparatus of claim 13, wherein each set of fields, of the respective sets of fields, includes a modulation and coding scheme field, a new data indicator field, and a redundancy version field.

15. The apparatus of claim 14, wherein each set of fields, of the respective sets of fields, further includes a hybrid automatic repeat request process identifier field.

16. The apparatus of claim 12, wherein the first set of fields indicates a different value for at least one field from a value indicated for the at least one field by the second set of fields.

17. The apparatus of claim 12, wherein the first set of fields includes one or more fields set to particular values to indicate that the first transport block is inactive.

18. The apparatus of claim 17, wherein the one or more fields include a modulation and coding scheme field and a redundancy version field.

19. The apparatus of claim 12, wherein the uplink grant information includes at least one bit, that is applicable to the multiple transport blocks, indicating which of the multiple transport blocks is active.

20. The apparatus of claim 12, wherein the first transport block and the second transport block are associated with initial transmissions scheduled by a same uplink grant, and
   wherein the uplink grant information is for retransmissions of the first transport block and the second transport block.

21. The apparatus of claim 12, wherein the first transport block and the second transport block are associated with initial transmissions scheduled by a same uplink grant, and
   wherein the uplink grant information is for a retransmission of only one of the first transport block or the second transport block.

22. The apparatus of claim 12, wherein the first transport block is associated with a first hybrid automatic repeat request (HARQ) process identifier and the second transport block is associated with a second HARQ process identifier,
   wherein the first transport block and the second transport block are associated with initial transmissions scheduled by separate uplink grants, and
   wherein the uplink grant information is for retransmissions of the first transport block and the second transport block.

23. A method of wireless communication performed by an apparatus of a user equipment (UE), comprising:
   receiving downlink control information (DCI) that includes an uplink grant information relating to multiple transport blocks for an uplink transmission,
      the uplink grant information indicating which of the multiple transport blocks is to be transmitted, and
      the uplink grant information including a first set of fields for a first transport block of the multiple transport blocks and a second set of fields for a second transport block of the multiple transport blocks; and
   transmitting one or more of the multiple transport blocks in accordance with the DCI.

24. The method of claim 23, wherein the uplink grant information includes respective sets of fields for the multiple transport blocks.

25. The method of claim 24, wherein each set of fields, of the respective sets of fields, includes a modulation and coding scheme field, a new data indicator field, and a redundancy version field.

26. The method of claim 23, wherein the set of fields, includes one or more fields set to particular values to indicate that the first transport block is inactive.

27. The method of claim 26, wherein the one or more fields include a modulation and coding scheme field and a redundancy version field.

28. A method of wireless communication performed by an apparatus of a network node, comprising:

transmitting downlink control information (DCI) that includes an uplink grant information relating to multiple transport blocks for an uplink transmission, the uplink grant information indicating which of the multiple transport blocks is to be transmitted, and the uplink grant information including a first set of fields for a first transport block of the multiple transport blocks and a second set of fields for a second transport block of the multiple transport blocks; and receiving one or more of the multiple transport blocks in accordance with the DCI.

29. The method of claim 28, wherein the uplink grant information includes respective sets of fields for the multiple transport blocks.

30. The method of claim 29, wherein each set of fields, of the respective sets of fields, includes a modulation and coding scheme field, a new data indicator field, and a redundancy version field.

\*   \*   \*   \*   \*